US012182820B2

(12) United States Patent
Markh

(10) Patent No.: US 12,182,820 B2
(45) Date of Patent: Dec. 31, 2024

(54) SYSTEM, METHOD, AND COMPUTER PROGRAM PRODUCT FOR DETERMINING A PSEUDO-IDENTITY SCORE IN A VIRTUAL ENVIRONMENT BASED ON A BLOCKCHAIN NETWORK

(71) Applicant: Visa International Service Association, San Francisco, CA (US)

(72) Inventor: John Markh, Burlington (CA)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/271,345

(22) PCT Filed: Dec. 6, 2022

(86) PCT No.: PCT/US2022/051975
§ 371 (c)(1),
(2) Date: Jul. 7, 2023

(87) PCT Pub. No.: WO2024/123312
PCT Pub. Date: Jun. 13, 2024

(65) Prior Publication Data
US 2024/0185251 A1    Jun. 6, 2024

(51) Int. Cl.
*G06Q 20/40*    (2012.01)
*G06Q 20/38*    (2012.01)

(52) U.S. Cl.
CPC ....... *G06Q 20/4016* (2013.01); *G06Q 20/389* (2013.01)

(58) Field of Classification Search
CPC .......... G06Q 20/4016; G06Q 20/389
See application file for complete search history.

(56) References Cited

U.S. PATENT DOCUMENTS 10,819,503 B2 *  10/2020  Nandakumar ...... H04L 63/1416
10,880,073 B2    12/2020  Hwang et al.
11,054,901 B2     7/2021  Peters
(Continued)

FOREIGN PATENT DOCUMENTS

WO    WO-2019157267 A1 *  8/2019  ............. G06F 16/27

OTHER PUBLICATIONS

Huang et al., "Metaverse: Digital Identity White Paper", 2017, pp. 1-22.

*Primary Examiner* — Eric T Wong
*Assistant Examiner* — Matthew Cobb
(74) *Attorney, Agent, or Firm* — The Webb Law Firm

(57) ABSTRACT

Provided is a system, method, and computer program product for determining a pseudo-identity score in a virtual environment based on a blockchain network. The system includes at least one processor programmed or configured to identify a pseudo-identity in a virtual environment based on a blockchain address on a blockchain network, the pseudo-identity corresponding to the blockchain address, determine an age of the pseudo-identity, determine a measure of activity of the pseudo-identity based on transactions conducted by the pseudo-identity in the virtual environment, determine a pseudo-identity score based at least partially on the age of the pseudo-identity and the measure of activity of the pseudo-identity, and process a request generated by the pseudo-identity in the virtual environment based on the pseudo-identity score.

12 Claims, 3 Drawing Sheets

(56) References Cited

U.S. PATENT DOCUMENTS

| | | | |
|---|---|---|---|
| 11,068,473 | B1 | 7/2021 | Wyner et al. |
| 11,146,535 | B2* | 10/2021 | Castagna ............ H04L 63/0407 |
| 2017/0364920 | A1* | 12/2017 | Anand ................ H04L 63/0861 |
| 2019/0122149 | A1* | 4/2019 | Caldera ................ H04L 63/102 |
| 2020/0127844 | A1 | 4/2020 | van der Laak et al. |
| 2022/0414664 | A1* | 12/2022 | Liu ........................ H04L 9/3247 |
| 2023/0006976 | A1* | 1/2023 | Jakobsson ........... H04L 63/1441 |
| 2023/0117135 | A1* | 4/2023 | Quigley ............. G06Q 20/3678 |
| | | | 705/65 |
| 2023/0360044 | A1* | 11/2023 | Patel ................. G06Q 20/4016 |

* cited by examiner

SYSTEM, METHOD, AND COMPUTER PROGRAM PRODUCT FOR DETERMINING A PSEUDO-IDENTITY SCORE IN A VIRTUAL ENVIRONMENT BASED ON A BLOCKCHAIN NETWORK

CROSS-REFERENCE TO RELATED APPLICATION

This application is the United States national phase of International Application No. PCT/US2022/051975 filed Dec. 6, 2022, the entire disclosure of which is hereby incorporated by reference in its entirety.

BACKGROUND

1. Technical Field

The present disclosure relates generally to blockchain networks and, in some non-limiting aspects or embodiments, to systems, methods, and computer program products for determining a pseudo-identity score in a virtual environment based on a blockchain network.

2. Technical Considerations

Virtual environments are becoming increasingly popular for users to engage in social and financial interactions with others. The adoption of virtual environments is further accelerated by the evolution of spatial technologies and enhanced virtual user experience, as well as maturity and adoption of blockchain, digital currencies (e.g., including cryptocurrencies), and decentralized finances. Currently, purchases within a virtual environment use a physical payment device (e.g., a credit or debit card) and the products are delivered to the consumer's physical address.

SUMMARY

According to non-limiting embodiments or aspects, provided is a computer-implemented method comprising: identifying, with at least one processor, a pseudo-identity in a virtual environment based on a blockchain address on a blockchain network, the pseudo-identity corresponding to the blockchain address; determining, with at least one processor, an age of the pseudo-identity; determining, with at least one processor, a measure of activity of the pseudo-identity based on transactions conducted by the pseudo-identity in the virtual environment; determining, with at least one processor, a pseudo-identity score based at least partially on the age of the pseudo-identity and the measure of activity of the pseudo-identity; and processing, with at least one processor, a request generated by the pseudo-identity in the virtual environment based on the pseudo-identity score.

In non-limiting embodiments or aspects, further comprising: determining, with at least one processor, a measure of validation of the pseudo-identity based on a total amount of funds staked by the blockchain address on the blockchain network, the pseudo-identity score is determined based at least partially on the measure of validation. In non-limiting embodiments or aspects, wherein determining the age of the pseudo-identity comprises determining a duration of time that the blockchain address has existed in the blockchain network. In non-limiting embodiments or aspects, wherein processing the request comprises generating a block on the blockchain network. In non-limiting embodiments or aspects, further comprising determining a risk score based on the pseudo-identity score, wherein processing the request is based on comparing the risk score to a threshold. In non-limiting embodiments or aspects, further comprising: linking the pseudo-identity to an avatar corresponding to the blockchain address, the avatar comprising a non-fungible token (NFT). In non-limiting embodiments or aspects, further comprising determining a weight of the NFT based on the age of the pseudo-identity and a number of the transactions conducted by the pseudo-identity in the virtual environment, the pseudo-identity score is based on the weight of the NFT.

According to non-limiting embodiments or aspects, provided is a system comprising: at least one processor programmed or configured to: identify a pseudo-identity in a virtual environment based on a blockchain address on a blockchain network, the pseudo-identity corresponding to the blockchain address; determine an age of the pseudo-identity; determine a measure of activity of the pseudo-identity based on transactions conducted by the pseudo-identity in the virtual environment; determine a pseudo-identity score based at least partially on the age of the pseudo-identity and the measure of activity of the pseudo-identity; and process a request generated by the pseudo-identity in the virtual environment based on the pseudo-identity score.

In non-limiting embodiments or aspects, the at least one processor is further programmed or configured to: determine a measure of validation of the pseudo-identity based on a total amount of funds staked by the blockchain address on the blockchain network, the pseudo-identity score is determined based at least partially on the measure of validation. In non-limiting embodiments or aspects, wherein determining the age of the pseudo-identity comprises determining a duration of time that the blockchain address has existed in the blockchain network. In non-limiting embodiments or aspects, wherein processing the request comprises generating a block on the blockchain network. In non-limiting embodiments or aspects, the at least one processor is further programmed or configured to: determine a risk score based on the pseudo-identity score, wherein processing the request is based on comparing the risk score to a threshold. In non-limiting embodiments or aspects, the at least one processor is further programmed or configured to: link the pseudo-identity to an avatar corresponding to the blockchain address, the avatar comprising a non-fungible token (NFT). In non-limiting embodiments or aspects, the at least one processor is further programmed or configured to: determine a weight of the NFT based on the age of the pseudo-identity and a number of the transactions conducted by the pseudo-identity in the virtual environment, the pseudo-identity score is based on the weight of the NFT.

According to non-limiting embodiments or aspects, provided is a computer program product comprising at least one non-transitory computer-readable medium including program instructions that, when executed by at least one processor, cause the at least one processor to: identify a pseudo-identity in a virtual environment based on a blockchain address on a blockchain network, the pseudo-identity corresponding to the blockchain address; determine an age of the pseudo-identity; determine a measure of activity of the pseudo-identity based on transactions conducted by the pseudo-identity in the virtual environment; determine a pseudo-identity score based at least partially on the age of the pseudo-identity and the measure of activity of the pseudo-identity; and process a request generated by the pseudo-identity in the virtual environment based on the pseudo-identity score.

In non-limiting embodiments or aspects, the program instructions cause the at least one processor to: determine a measure of validation of the pseudo-identity based on a total amount of funds staked by the blockchain address on the blockchain network, the pseudo-identity score is determined based at least partially on the measure of validation. In non-limiting embodiments or aspects, the program instructions cause the at least one processor to: determine a risk score based on the pseudo-identity score, wherein processing the request is based on comparing the risk score to a threshold. In non-limiting embodiments or aspects, the program instructions cause the at least one processor to: link the pseudo-identity to an avatar corresponding to the blockchain address, the avatar comprising a non-fungible token (NFT). In non-limiting embodiments or aspects, the program instructions cause the at least one processor to: determine a weight of the NFT based on the age of the pseudo-identity and a number of the transactions conducted by the pseudo-identity in the virtual environment, the pseudo-identity score is based on the weight of the NFT.

Further non-limiting embodiments or aspects are set forth in the following numbered clauses:

Clause 1: A computer-implemented method comprising: identifying, with at least one processor, a pseudo-identity in a virtual environment based on a blockchain address on a blockchain network, the pseudo-identity corresponding to the blockchain address; determining, with at least one processor, an age of the pseudo-identity; determining, with at least one processor, a measure of activity of the pseudo-identity based on transactions conducted by the pseudo-identity in the virtual environment; determining, with at least one processor, a pseudo-identity score based at least partially on the age of the pseudo-identity and the measure of activity of the pseudo-identity; and processing, with at least one processor, a request generated by the pseudo-identity in the virtual environment based on the pseudo-identity score.

Clause 2: The computer-implemented method of clause 1, further comprising: determining, with at least one processor, a measure of validation of the pseudo-identity based on a total amount of funds staked by the blockchain address on the blockchain network, wherein the pseudo-identity score is determined based at least partially on the measure of validation.

Clause 3: The computer-implemented method of clauses 1 or 2, wherein determining the age of the pseudo-identity comprises determining a duration of time that the blockchain address has existed in the blockchain network.

Clause 4: The computer-implemented method of any of clauses 1-3, wherein processing the request comprises generating a block on the blockchain network.

Clause 5: The computer-implemented method of any of clauses 1-4, further comprising determining a risk score based on the pseudo-identity score, wherein processing the request is based on comparing the risk score to a threshold.

Clause 6: The computer-implemented method of any of clauses 1-5, further comprising: linking the pseudo-identity to an avatar corresponding to the blockchain address, the avatar comprising a non-fungible token (NFT).

Clause 7: The computer-implemented method of any of clauses 1-6, further comprising determining a weight of the NFT based on the age of the pseudo-identity and a number of the transactions conducted by the pseudo-identity in the virtual environment, wherein the pseudo-identity score is based on the weight of the NFT.

Clause 8: A system comprising: at least one processor programmed or configured to: identify a pseudo-identity in a virtual environment based on a blockchain address on a blockchain network, the pseudo-identity corresponding to the blockchain address; determine an age of the pseudo-identity; determine a measure of activity of the pseudo-identity based on transactions conducted by the pseudo-identity in the virtual environment; determine a pseudo-identity score based at least partially on the age of the pseudo-identity and the measure of activity of the pseudo-identity; and process a request generated by the pseudo-identity in the virtual environment based on the pseudo-identity score.

Clause 9: The system of clause 8, wherein the at least one processor is further programmed or configured to: determine a measure of validation of the pseudo-identity based on a total amount of funds staked by the blockchain address on the blockchain network, wherein the pseudo-identity score is determined based at least partially on the measure of validation.

Clause 10: The system of clauses 8 or 9, wherein determining the age of the pseudo-identity comprises determining a duration of time that the blockchain address has existed in the blockchain network.

Clause 11: The system of any of clauses 8-10, wherein processing the request comprises generating a block on the blockchain network.

Clause 12: The system of any of clauses 8-11, wherein the at least one processor is further programmed or configured to: determine a risk score based on the pseudo-identity score, wherein processing the request is based on comparing the risk score to a threshold.

Clause 13: The system of any of clauses 8-12, wherein the at least one processor is further programmed or configured to: link the pseudo-identity to an avatar corresponding to the blockchain address, the avatar comprising a non-fungible token (NFT).

Clause 14: The system of any of clauses 8-13, wherein the at least one processor is further programmed or configured to: determine a weight of the NFT based on the age of the pseudo-identity and a number of the transactions conducted by the pseudo-identity in the virtual environment, wherein the pseudo-identity score is based on the weight of the NFT.

Clause 15: A computer program product comprising at least one non-transitory computer-readable medium including program instructions that, when executed by at least one processor, cause the at least one processor to: identify a pseudo-identity in a virtual environment based on a blockchain address on a blockchain network, the pseudo-identity corresponding to the blockchain address; determine an age of the pseudo-identity; determine a measure of activity of the pseudo-identity based on transactions conducted by the pseudo-identity in the virtual environment; determine a pseudo-identity score based at least partially on the age of the pseudo-identity and the measure of activity of the pseudo-identity; and process a request generated by the pseudo-identity in the virtual environment based on the pseudo-identity score.

Clause 16: The computer program product of clause 15, wherein the program instructions cause the at least one processor to: determine a measure of validation of the pseudo-identity based on a total amount of funds staked by the blockchain address on the blockchain network, wherein the pseudo-identity score is determined based at least partially on the measure of validation.

Clause 17: The computer program product of clauses 15 or 16, wherein the program instructions cause the at least one processor to: determine a risk score based on the pseudo-identity score, wherein processing the request is based on comparing the risk score to a threshold.

Clause 18: The computer program product of any of clauses 15-17, wherein the program instructions cause the at least one processor to: link the pseudo-identity to an avatar corresponding to the blockchain address, the avatar comprising a non-fungible token (NFT).

Clause 19: The computer program product of any of clauses 15-18, wherein the program instructions cause the at least one processor to: determine a weight of the NFT based on the age of the pseudo-identity and a number of the transactions conducted by the pseudo-identity in the virtual environment, wherein the pseudo-identity score is based on the weight of the NFT.

These and other features and characteristics of the presently disclosed subject matter, as well as the methods of operation and functions of the related elements of structures and the combination of parts and economies of manufacture, will become more apparent based on the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
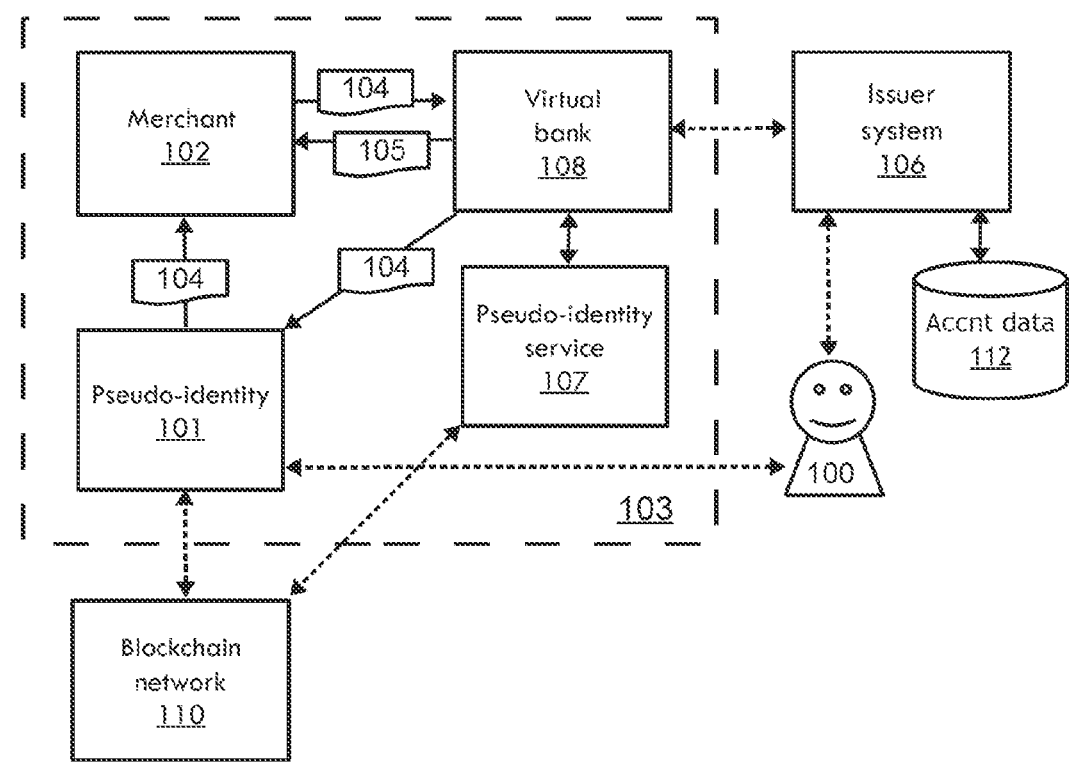
FIG. 1 is a schematic diagram of a system for determining a pseudo-identity score in a virtual environment based on a blockchain network according to non-limiting aspects or embodiments.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "issuer," "issuer institution," "issuer bank," or "payment device issuer" may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, "issuer system" may refer to one or more computer systems operated by or on behalf of an issuer, such as a server executing one or more software applications. For example, an issuer system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, "merchant system" may refer to one or more computer systems operated by or on behalf of a merchant, such as a server executing one or more software applications. As used herein, the term "product" may refer to one or more goods and/or services offered by a merchant.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "account identifier" may include one or more PANs, account tokens, or other identifiers associated with a customer account. Account identifiers may be alphanumeric or any combination of characters and/or symbols.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa, MasterCard®, American Express®, or any other entity that processes transactions. As used herein, "transaction processing system" may refer to one or more computer systems operated by or on behalf of a transaction service provider, such as a transaction processing server executing one or more software applications. A transaction processing system may include one or more processors and, in some non-limiting embodiments, may be operated by or on behalf of a transaction service provider.

Described herein are systems, methods, and computer program products for determining a pseudo-identity score in a virtual environment based on a blockchain network. Non-limiting embodiments described herein provide for solutions for technological problems that arise in virtual environments, such as a "metaverse" environment, relating to processing electronic transactions involving pseudo-identities. For example, non-limiting embodiments described herein provide for a bridge between activity that occurs in a virtual environment and activity that occurs in the physical world, allowing stakeholders in electronic payment networks to engage with and facilitate transactions that occur only in a virtual environment. Moreover, non-limiting embodiments described herein provide for a virtual payment instrument that is used in a virtual environment by a pseudo-identity of an account holder. Non-limiting embodiments determine a pseudo-identity score for a pseudo-identity that reflects activity within the virtual environment and may be based on attributes that are unique to virtual environments and pseudo-identities operating within such environments. For example, pseudo-identities may be transferred among entities and/or account holders, which is not possible with real identities in the physical world that correspond to a single entity and/or account holder, and such transferability and history of transfer may influence a score used to assess risk, creditworthiness, and/or the like of a pseudo-identity. Various other advantages and improvements are described herein.

Referring to FIG. 1, illustrated is a diagram of a system 1000 for determining a pseudo-identity score in a virtual environment based on a blockchain network 110. As illustrated in FIG. 1, the system 1000 includes an issuer system 106 that has a relationship with an account holder 100 (e.g., the issuer system 106 corresponds to an issuer institution that issued a payment device for an account to the account holder 100). The issuer system 106 may be in communication with account data 112, which may be stored on one or more data storage devices remote or local to the issuer system 106 and may include credit scores, transaction histories, and/or the like for a plurality of accounts.

The system 1000 shown in FIG. 1 further includes a virtual environment 103. The virtual environment 103 may include any virtual reality (VR) and/or augmented reality (AR) environment, such as but not limited to a "metaverse" environment, a gaming environment, and/or the like. The virtual environment 103 may be accessed by the account holder 100 and/or other users through one or more computing devices, such as a VR or AR headset, mobile device, and/or the like. In some examples, the account holder 100 may be represented by a pseudo-identity 101. The pseudo-identity 101 may include an avatar, such as a graphical representation (e.g., an icon, image, picture, photograph, three-dimensional model, and/or the like) of a user in the virtual environment. In some examples the avatar may move within and interact with the virtual environment. In some examples the avatar may be used as a profile picture and/or the like. The pseudo-identity 101 may include a pseudonym, such as a handle, user name, or the like.

In non-limiting embodiments, the pseudo-identity 101 may interact with one or more other entities in the virtual environment 103, such as a merchant 102 and/or virtual bank 108. For example, the pseudo-identity 101 may interact with the merchant 102 in the virtual environment 103 to purchase goods and/or services within the virtual environment 103. Such virtual goods and/or services may exist entirely within the virtual environment 103, such as virtual real estate, tokens, game enhancements or add-ons, design services (e.g., avatar design, virtual real estate design and architecture services, virtual clothing or accessory design, virtual vehicle design, and/or the like), advertising services (e.g., purchasing advertising space within the virtual environment), virtual events (e.g., attending concerts or shows within the virtual environment 103), and/or the like. The merchant 102 may be a store that corresponds with a real-world merchant or, in other examples, exist only within the virtual environment 103. The merchant 102 may include a commercial entity and/or other users in the virtual environment 103 that are offering goods and/or services.

With continued reference to FIG. 1, the pseudo-identity 101 controlled by a user (e.g., account holder 100) may interact with a virtual bank 108 to request a virtual payment device 104 that can be used within the virtual environment 103. For example, a virtual bank may issue a virtual payment device 104 to the pseudo-identity that may be used to conduct transactions that occur within the virtual environment 103. The virtual payment device 104 may include an account identifier, token, key, and/or the like. The virtual payment device 104 may transact in digital currency, such as a cryptocurrency, and/or a fiat currency. In some non-limiting embodiments, the virtual payment device 104 may be linked to a physical payment device issued by the issuer system 106. In some non-limiting embodiments, the virtual payment device 104 may be a wallet associated with a cryptocurrency balance. The pseudo-identity 101 may use the virtual payment device 104 to engage in a transaction with the merchant 102. The merchant 102, in response to such a transaction, may send the virtual payment device 104 and/or an authorization request identifying the virtual payment device 104 to the virtual bank 108, which responds with an authorization response message 105 approving or denying the transaction.

In non-limiting embodiments, the pseudo-identity corresponds to a blockchain address in the blockchain network 110. For example, in non-limiting embodiments in which the pseudo-identity includes a non-fungible token (NFT), the NFT and/or a smart contract related thereto may be associated with a unique blockchain address in the blockchain network 110 that is linked to the NFT on a distributed ledger within the blockchain network 110. As an example, a pseudo-identity may be associated with an avatar image that is minted to the blockchain network as an NFT and recorded on a distributed ledger as corresponding to the blockchain address for the pseudo-identity. The blockchain address may include a digital wallet address, as an example, and may be based on a public/private key pair. It will be appreciated that different blockchain networks 110 may implement different protocols. An NFT may include any media, such as image, video, and/or audio. It will be appreciated that, in some non-limiting embodiments, an NFT may not be used and the blockchain address may be associated with a cryptocurrency balance, one or more smart contracts, and/or the like.

With continued reference to FIG. 1, the system 1000 may include a pseudo-identity service 107, which may include software executed by one or more computing devices for determining a pseudo-identity score. The pseudo-identity service 107 may operate within the virtual environment 103 and/or external to the virtual environment 103. For example, in non-limiting embodiments the pseudo-identity service 107 may be queried from within the virtual environment 103 (e.g., by the merchant 102, virtual bank 108, and/or other entities) for triggering one or more actions by a server computer. The pseudo-identity service 107 may execute one or more algorithms to determine a pseudo-identity score. For example, the pseudo-identity service 107 may determine a plurality of different pseudo-identity parameters and combine the pseudo-identity parameters into a pseudo-identity score based on one or more algorithms.

In non-limiting embodiments, the pseudo-identity service 107 may determine a pseudo-identity score for of the pseudo-identity 101 based on an age of the pseudo-identity. For example, in non-limiting embodiments in which an NFT avatar is minted and associated with the pseudo-identity 101 (e.g., linked to a blockchain address), the age of the pseudo-identity may include an age of the avatar and/or blockchain address (e.g., a time since the avatar was minted on the blockchain, a time since the blockchain address was first associated with an asset such as an NFT or other token(s), and/or the like). In some non-limiting embodiments, the score for the pseudo-identity may be determined based on a function of the age of the pseudo-identity and transaction activity of the pseudo-identity. For example, a number of days, weeks, or months that the pseudo-identity has existed may be divided by a total number of transactions and/or a total value of transactions to determine a weight of the pseudo-identity. The weight of the pseudo-identity may be used as a pseudo-identity score or may be used as a parameter (e.g., subscore) that is combined with other parameters to generate a pseudo-identity score. It will be appreciated that various other calculations may be used.

As an example, where i=address(NFT) (e.g., a blockchain address associated with an NFT avatar), a value of function "weight(NFT)" may be determined as age(i)/transactions(i) (e.g., a ratio of an age of a blockchain address or pseudo-identity to a number of transactions involving the pseudo-identity). In some examples, the transactions may be transactions that involve the NFT avatar or pseudo-identity (e.g., creation or transfer). The transferability of a pseudo-identity among users is an attribute that differentiates pseudo-identities in a virtual environment from actual identities in the physical world. For example, for an avatar that was minted (created) as an NFT ten years prior to a request for pseudo-identity authentication (e.g., a request for a pseudo-identity score from the pseudo-identity service 107) that has only one transaction (e.g., being created) may have a value of 521 (a rounded value of the weeks it existed). As another example, an avatar that is only two days old but has changed ownership four times (an indication of a possible identify fraud) may have a value of 0.28/4=0.07. In non-limiting embodiments, the weight of a pseudo-identity or NFT thereof may be directly proportional to the time it has existed and inversely proportional to the number of times that the pseudo-identity has been transferred.

In non-limiting embodiments, the pseudo-identity service 107 may determine a pseudo-identity score for the pseudo-identity 101 based on a measure of activity of the blockchain address and/or pseudo-identity (e.g., a weight of on-chain behavior for a blockchain address) that include transactions conducted by the pseudo-identity in the virtual environment. In some examples, transactions may include activity on the blockchain network 110 (e.g., on-chain behavior, such as minting NFTs, transferring NFTs via transactions, sending cryptocurrency payments, receiving cryptocurrency payments, and/or the like). In some examples, the activity may only include payment transactions and not NFT transfers or creations. It will be appreciated that various types of activity and/or transactions may be used. In many blockchain networks, the blockchain data is public and can be explored using blockchain explorer applications such as like Messari®, Dune Analytics®, and Glassnode®. While on-chain activity can be a positive indicator of a non-dormant or non-abandoned pseudo-identity, the weight of the activity can be balanced with the ease for individuals, including potential fraudulent users, to create new pseudo-identifies and NFT avatars and/or engaging in fictitious transactions (e.g., transactions created for the purpose of deceiving a fraud detection algorithm that the pseudo-identity is active and therefore legitimate). In non-limiting embodiments, activity may be determined separately for each period of time (e.g., each year). Such determinations may use a mapping table, such as Table 1:

TABLE 1

| Transaction per Year | Weight |
|---|---|
| 0-10 | 1 |
| 10-99 | 25 |
| 99-499 | 50 |
| 499+ | 100 |

Using a mapping table such as Table 1, the overall weight of on-chain behavior may be determined by summing the activity of each year since the genesis of the blockchain to the time that a request for pseudo-identity authentication (e.g., a request for a pseudo-identity score from the pseudo-identity service 107) is made. The activity may include all transactions associated with a blockchain address, including payments being made and received (e.g., via cryptocurrency), or a subset of such transactions. For example, where i=address(NFT), this calculation may be represented by the following equation:

$$\text{weight(behavior)} = \sum_{year=genesis}^{today} \text{weight}\big(\text{transaction}(i)_{year}\big)$$

For example, a pseudo-identity or a wallet (e.g., blockchain address) that was created seven years prior to determining the weight of on-chain behavior with the following activity pattern: [300, 23, 0, 49, 0, 1, 15] may have the following weight assigned to it: 50+25+0+25+0+0+25=125.

In non-limiting embodiments, the pseudo-identity service 107 may determine a pseudo-identity score for the pseudo-identity 101 based on fund staking associated with the blockchain address associated with the pseudo-identity 101 (e.g., a weight of fund staking for a blockchain address). Fund staking involves purchasing and holding a certain amount of digital assets (e.g., such as cryptographic tokens, cryptocurrency, etc.) on a blockchain network 110. In some non-limiting embodiments, a staking pool on the blockchain network may combine computational power from multiple entities. Various blockchain protocols may be used to prove a particular user's stake using cryptographic key pairs associated with blockchain addresses. In some examples, fund staking may be used in a DeFi (Decentralized Finance) environment to participate in the governance and security of a blockchain network, to contribute to the transaction verification process of a blockchain network, and/or to generate rewards or income (e.g., as a passive investment strategy). The amount and the age of fund staking can be a positive indicator of strength or trust of a pseudo-identity. However, to reduce a possible abuse of this parameter (e.g., by staking a large amount of funds for a micro-period than immediately disbursing the funds), in non-limiting embodiments the average of staked funds per year and the age of the funds is calculated. This is shown in the following Table 2:

TABLE 2

| Fund Staking (per year) in USD | Weight |
|---|---|
| 0-1,000 | 1 |
| 1,000-4,999 | 25 |
| 5000-9,999 | 50 |
| 9,999+ | 100 |

Based on Table 2, the overall weight of funds staking can be determined by summing the weight of a monthly value of the funds as shown in the following equation:

$$i = \text{address}(NFT)$$

$$\text{weight(fund staking)} = \sum_{month=gnesis}^{today} \text{weight}(\text{funds}(i)_{month})$$

In non-limiting embodiments, one or more pseudo-identity parameters (e.g., a weight of an NFT, a weight of on-chain activity, a weight of fund staking, and/or the like) may be combined into a pseudo-identity score. A pseudo-identity score may be used to determine or represent creditworthiness, as an example. In non-limiting embodiments in which an NFT weight (e.g., NFT subscore), behavior weight (e.g., behavior subscore), and fund staking weight (e.g., fund staking subscore) is determined for a pseudo-identity, they may be combined as shown:

$$\text{weight}_{NFT}*(\text{weight}_{behaviour}+\text{weight}_{fund\ staking})$$

In other non-limiting embodiments, the weights or subscores may also be combined as follows:

$$\text{weight}_{NFT}+\text{weight}_{behaviour}+\text{weight}_{fund\ staking}$$

In non-limiting embodiments, participants in the virtual environment (e.g., such as merchants, banks, and/or the like) may query the pseudo-identity service 107 to return a pseudo-identity score for the pseudo-identity. In non-limiting embodiments, each participant may establish one or more thresholds to determine if a score meets or exceeds a level of risk. For example, for certain participants a pseudo-identity with a score of 256 may be acceptable, while for others 512 may be a minimal benchmark. In other non-limiting embodiments, the pseudo-identity service 107 may compare the score to a predetermined or dynamic threshold and return a determination (e.g., low risk, medium risk, high risk, decline, authorize, and/or the like) based on the comparison.

In non-limiting embodiments, virtual financial institutions such as virtual bank 108 may be able to or may be required to establish a benchmark for minimum creditworthiness (e.g., a pseudo-identity score threshold) that changes as the blockchain network "age" and risk-landscape evolve. For example, a score of 50 may have a different meaning when the "age" of the blockchain (and not just the pseudo-identity on the blockchain) is 1-2 years old, versus a blockchain network that is operational for more than ten years.

To illustrate a non-limiting embodiment, an example may include a user that has an active account (e.g., maintains the same pseudo-identity) for five years before requesting a virtual payment device 104 (e.g., such as a cryptocurrency loan associated with an account identifier that corresponds to a blockchain address) from a virtual bank 108. In such an example, weight(NFT): 5/1=5; weight(behavior): 50+25+25+1+25=126; and weight(fund staking): 25+50+50+50=225. The overall creditworthiness (or pseudo-identity score) may therefore be calculated as: 5*(126+225)=1755, and based on the score the request will be approved.

As another example, a malicious actor may create an account or pseudo-identity and let it remain dormant for multiple (e.g., seven) years, and then reactivates it to apply for a cryptocurrency loan or other like request. Assuming that a few transactions were initiated when the account was originally created, and a few transactions before applying for a credit, the weights (e.g., subscores) may be determined as: weight(NFT): 7/1=7; weight(behavior): <1; weight (fund): <1. The overall creditworthiness (or pseudo-identity score) may therefore be calculated as: 7*(1+1)=14, and based on the low score the application for the cryptocurrency loan may be rejected.

As another example, a malicious actor may create a fake account, with a large number of transactions, before applying for a cryptocurrency loan or credit. In this example scenario, the weights (e.g., subscores) may be determined as: weight(NFT): 1/1=1; weight(behavior): 100; weight (fund): 1. The overall creditworthiness (or pseudo-identity score) may therefore be calculated as: 1*(100+1)=101, and based on the low score the application for the cryptocurrency loan may be rejected.

As another example, a malicious actor may create a fake account, with a large number of transactions and staking a large sum of money (e.g., over 10,000 USD or equivalent cryptocurrency) before applying for a cryptocurrency loan or credit. In this example scenario, the weights (e.g., subscores) may be determined as: weight(NFT): 1/1=1; weight (behavior): 100; weight (fund): 100. The overall creditworthiness (or pseudo-identity score) may therefore be calculated as: 1*(100+100)=200, and based on the low score the application for the cryptocurrency loan may be rejected.

Although the issuer system 106, account data 112, and other systems (e.g., the pseudo-identity service 107) are shown external to the blockchain network 110, it will be appreciated that the one or more of such systems may be participants in and/or operate as a node within the blockchain network 110.

Still referring to FIG. 1, in non-limiting embodiments the system 1000 includes one or more issuer systems 106 that facilitate one or more entities within the virtual environment 103. For example, the virtual bank 108 may be controlled by the issuer system 106 and/or in communication with the issuer system 106. In some examples, the virtual bank 108 may receive account data 112 from the issuer system 106 for an account holder 100 and use that account data 112 in combination with data from the blockchain network 110 to make determinations (e.g., determining a pseudo-identity score).

Figure 2:
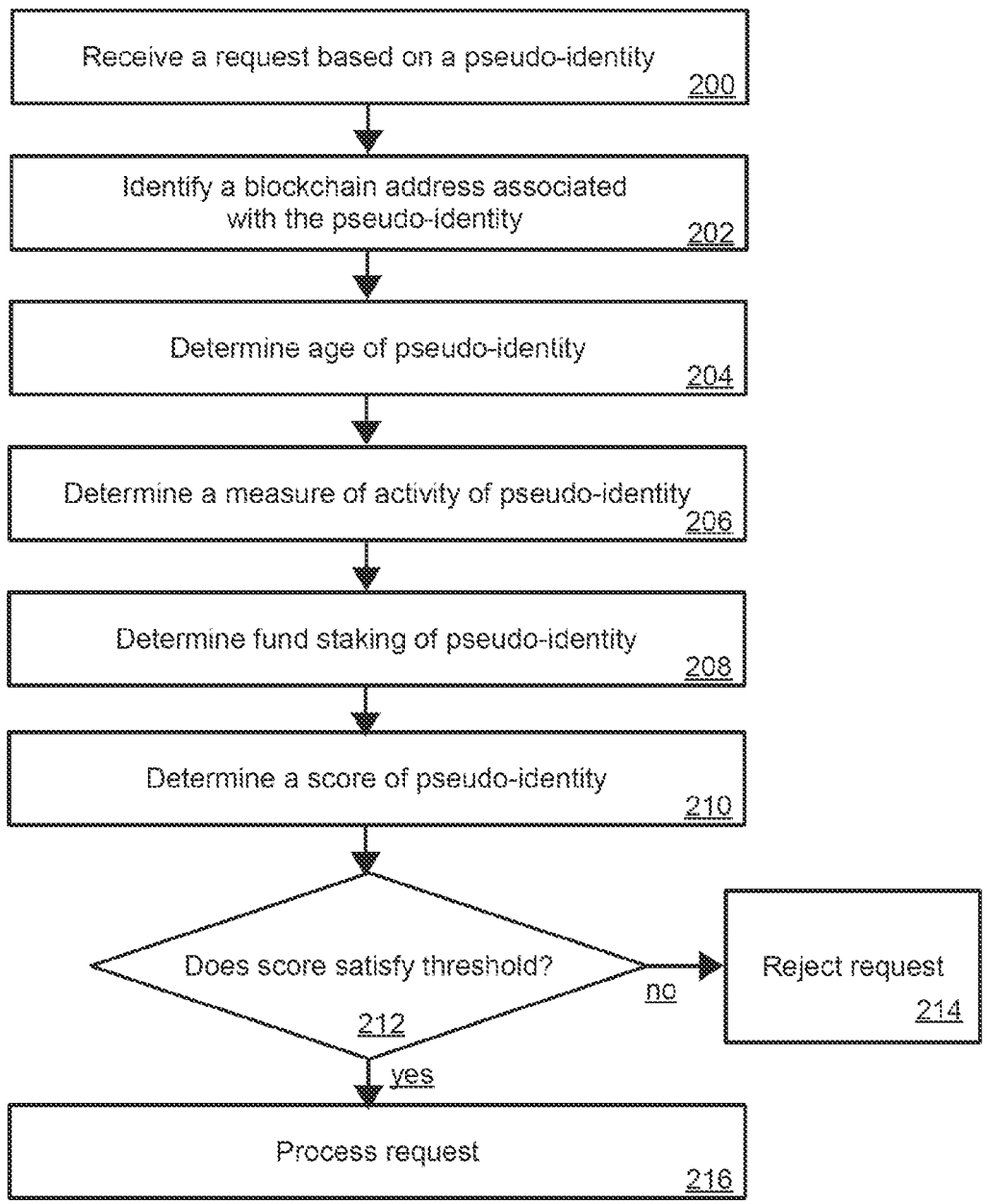
FIG. 2 is a flowchart of a method for determining a pseudo-identity score in a virtual environment based on a blockchain network according to non-limiting aspects or embodiments.

Referring now to FIG. 2, a flow diagram is shown for a process of determining a pseudo-identity score in a virtual environment based on a blockchain network according to non-limiting embodiments or aspects. The steps in FIG. 2 are for exemplary purposes only and it will be appreciated that additional, fewer, and/or a different order of steps may be used in non-limiting embodiments. In non-limiting embodiments, the steps shown in FIG. 2 may be performed by one or more computing devices. For example, the steps may be performed by a server computer.

At step 200, a request is received based on a pseudo-identity. In some examples, a request may be a transaction that is initiated by a pseudo-identity (e.g., a user operating a pseudo-identity in a virtual environment). A request may also be a request for a pseudo-identity score from a virtual bank, a merchant, another entity in a virtual environment, and/or the like. In some examples, a transaction initiated by a pseudo-identity may use a virtual payment device that is issued by a virtual bank. In some examples, a transaction initiated by a pseudo-identity may use a cryptocurrency wallet associated with a blockchain network. In some examples, a transaction initiated by a pseudo-identity may cause a merchant and/or virtual bank to request a pseudo-identity score for making a decision (e.g., deciding to authorize a transaction). In non-limiting embodiments, the request may be received through an Application Program Interface (API).

At step 202, a blockchain address associated with the pseudo-identity is identified. For example, if the pseudo-identity is an NFT avatar, a blockchain address associated with the NFT may be identified. A blockchain address may include a key value and/or a hash value, as examples. The request received at step 200 may include a blockchain address or data that can be used to derive the blockchain address.

At step 204, an age of the pseudo-identity is determined. For example, in non-limiting embodiments in which an NFT avatar is minted and associated with the pseudo-identity (e.g., linked to a blockchain address), the age of the pseudo-identity may include an age of the avatar and/or blockchain address (e.g., a time since the avatar was minted on the blockchain, a time since the blockchain address was first associated with an asset, and/or the like). For example, the age may include a number of days, weeks, or months that the pseudo-identity has existed. An NFT weight (e.g., subscore) for the pseudo-identity may be determined based on one or more algorithms.

At step 206, a measure of activity of the pseudo-identity is determined. For example, step 206 may include determining activity on the blockchain network (e.g., on-chain behavior, such as minting NFTs, transferring NFTs via transactions, and/or the like). In many blockchain networks, such blockchain data is public and can be explored using blockchain explorer applications such as like Messari®, Dune Analytics®, and Glassnode®. Such analysis may be automatic and based on one or more rules. A behavior weight (e.g., subscore) for the pseudo-identity may be determined based on one or more algorithms.

At step 208, a fund staking associated with the pseudo-identity may be determined. For example, the blockchain network may be queried for a current and/or historical asset (e.g., cryptocurrency) balance associated with a blockchain address corresponding to the pseudo-identity. A fund staking weight (e.g., subscore) may be determined based on one or more algorithms. Other and/or different pseudo-identity parameters may also be determined.

At step 210, the pseudo-identity parameters (e.g., weights) determined at steps 204-208 may be combined to determine a pseudo-identity score. For example, the weights may be added. A risk score for the pseudo-identity may include the pseudo-identity score and/or be derived from the pseudo-identity score. After the pseudo-identity score is determined, it may be communicated to the entity that requested it.

At step 212, it is determined if the pseudo-identity score satisfies (e.g., meets, exceeds, or the like) a threshold. The threshold may be predetermined, dynamic, specified by the requestor, and/or the like. In some examples, step 212 may be performed by the entity that requested the pseudo-identity score. In some examples, step 212 may be performed by the same system that generated the pseudo-identity score. It will be appreciated that variations are possible. If the pseudo-identity score and/or risk score does not satisfy the threshold, the request (e.g., a transaction request) may be rejected at step 214. If the pseudo-identity score satisfies the threshold, the method may proceed to step 216 at which the request is processed. For example, a transaction may be authorized, completed, and/or the like. In some examples, processing the request may include publishing a new block to the blockchain network to record a transaction.

Figure 3:
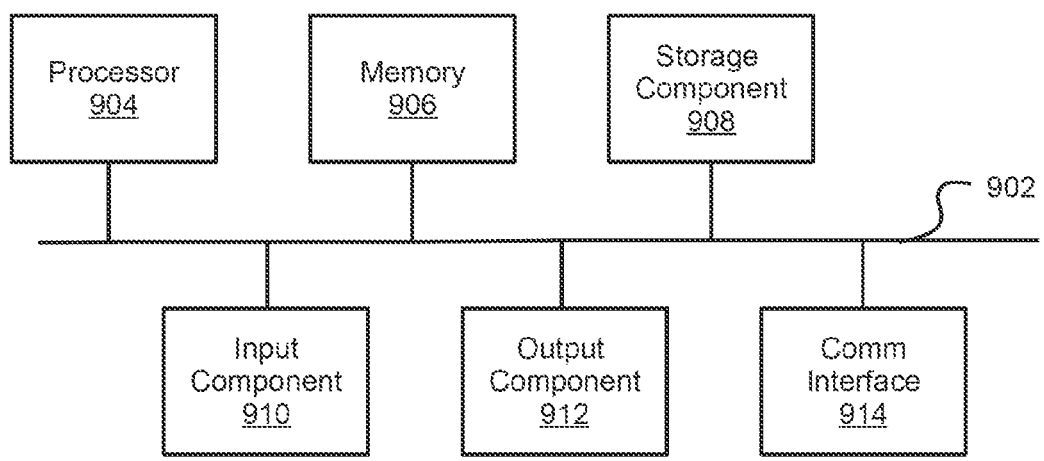
FIG. 3 is a diagram of components of one or more devices of FIG. 1 according to non-limiting aspects or embodiments.

Referring now to FIG. 3, shown is a diagram of example components of a computing device 900 for implementing and performing the systems and methods described herein according to non-limiting embodiments. The computing device 900 may represent, for example, the issuer system 106, pseudo-identity service 107, etc., from FIG. 1. In some non-limiting embodiments, device 900 may include additional components, fewer components, different components, or differently arranged components than those shown in FIG. 3. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 3 storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although examples have been described in detail for the purpose of illustration based on what is currently considered to be the most practical and preferred aspects or embodiments, it is to be understood that such detail is solely for that purpose and that the principles described by the present disclosure are not limited to the disclosed aspects or embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising:
at least one processor programmed or configured to:
identify a pseudo-identity in a virtual environment based on a blockchain address on a blockchain network, the pseudo-identity corresponding to the blockchain address;
determine an age of the pseudo-identity, the age comprising at least one of the following: an age of an avatar where the pseudo-identity comprises the avatar, an age of the blockchain address, or a time since the blockchain address was first associated with the pseudo-identity;
determine a measure of activity of the pseudo-identity based on transactions conducted by the pseudo-identity in the virtual environment, the measure of activity comprising a history of the pseudo-identity being transferred among users to change ownership of the pseudo-identity;
determine a measure of validation of the pseudo-identity based on a total amount of funds staked by the blockchain address on the blockchain network;
determine a pseudo-identity score based on the age of the pseudo-identity, the measure of activity of the pseudo-identity, and the measure of validation of the pseudo-identity; and
process a request generated by the pseudo-identity in the virtual environment based on the pseudo-identity score, wherein processing the request comprises generating a block on the blockchain network.

2. The system of claim 1, wherein the at least one processor is further programmed or configured to:
   determine a risk score based on the pseudo-identity score, wherein processing the request is based on comparing the risk score to a threshold.

3. The system of claim 1, wherein the at least one processor is further programmed or configured to:
   link the pseudo-identity to an avatar corresponding to the blockchain address, the avatar comprising a non-fungible token (NFT).

4. The system of claim 3, wherein the at least one processor is further programmed or configured to:
   determine a weight of the NFT based on the age of the pseudo-identity and a number of the transactions conducted by the pseudo-identity in the virtual environment, wherein the pseudo-identity score is based on the weight of the NFT.

5. A computer-implemented method comprising:
   identifying, with at least one processor, a pseudo-identity in a virtual environment based on a blockchain address on a blockchain network, the pseudo-identity corresponding to the blockchain address;
   determining, with at least one processor, an age of the pseudo-identity, the age comprising at least one of the following: an age of an avatar where the pseudo-identity comprises the avatar, an age of the blockchain address, or a time since the blockchain address was first associated with the pseudo-identity;
   determining, with at least one processor, a measure of activity of the pseudo-identity based on transactions conducted by the pseudo-identity in the virtual environment, the measure of activity comprising a history of the pseudo-identity being transferred among users to change ownership of the pseudo-identity;
   determining, with at least one processor, a measure of validation of the pseudo-identity based on a total amount of funds staked by the blockchain address on the blockchain network;
   determining, with at least one processor, a pseudo-identity score based on the age of the pseudo-identity, the measure of activity of the pseudo-identity, and the measure of validation of the pseudo-identity; and
   processing, with at least one processor, a request generated by the pseudo-identity in the virtual environment based on the pseudo-identity score, wherein processing the request comprises generating a block on the blockchain network.

6. The computer-implemented method of claim 5, further comprising determining a risk score based on the pseudo-identity score, wherein processing the request is based on comparing the risk score to a threshold.

7. The computer-implemented method of claim 5, further comprising:
   linking the pseudo-identity to an avatar corresponding to the blockchain address, the avatar comprising a non-fungible token (NFT).

8. The computer-implemented method of claim 7, further comprising determining a weight of the NFT based on the age of the pseudo-identity and a number of the transactions conducted by the pseudo-identity in the virtual environment, wherein the pseudo-identity score is based on the weight of the NFT.

9. A computer program product comprising at least one non-transitory computer-readable medium including program instructions that, when executed by at least one processor, cause the at least one processor to:
   identify a pseudo-identity in a virtual environment based on a blockchain address on a blockchain network, the pseudo-identity corresponding to the blockchain address;
   determine an age of the pseudo-identity, the age comprising at least one of the following: an age of an avatar where the pseudo-identity comprises the avatar, an age of the blockchain address, or a time since the blockchain address was first associated with the pseudo-identity;
   determine a measure of activity of the pseudo-identity based on transactions conducted by the pseudo-identity in the virtual environment, the measure of activity comprising a history of the pseudo-identity being transferred among users to change ownership of the pseudo-identity;
   determine a measure of validation of the pseudo-identity based on a total amount of funds staked by the blockchain address on the blockchain network;
   determine a pseudo-identity score based on the age of the pseudo-identity, the measure of activity of the pseudo-identity, and the measure of validation of the pseudo-identity; and
   process a request generated by the pseudo-identity in the virtual environment based on the pseudo-identity score, wherein processing the request comprises generating a block on the blockchain network.

10. The computer program product of claim 9, wherein the program instructions cause the at least one processor to:
    determine a risk score based on the pseudo-identity score, wherein processing the request is based on comparing the risk score to a threshold.

11. The computer program product of claim 9, wherein the program instructions cause the at least one processor to:
    link the pseudo-identity to an avatar corresponding to the blockchain address, the avatar comprising a non-fungible token (NFT).

12. The computer program product of claim 11, wherein the program instructions cause the at least one processor to:
    determine a weight of the NFT based on the age of the pseudo-identity and a number of the transactions conducted by the pseudo-identity in the virtual environment, wherein the pseudo-identity score is based on the weight of the NFT.

* * * * *